(12) United States Patent
Lobregt (10) Patent No.: US 7,616,835 B2
(45) Date of Patent: Nov. 10, 2009

(54) METHOD AND APPARATUS FOR OPTIMALLY MATCHING DATA SETS

(75) Inventor: Steven Lobregt, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 398 days.

(21) Appl. No.: 10/548,965

(22) PCT Filed: Mar. 15, 2004

(86) PCT No.: PCT/IB2004/050256
§ 371 (c)(1),
(2), (4) Date: Sep. 12, 2005

(87) PCT Pub. No.: WO2004/084141
PCT Pub. Date: Sep. 30, 2004

(65) Prior Publication Data
US 2006/0285771 A1 Dec. 21, 2006

(30) Foreign Application Priority Data
Mar. 18, 2003 (EP) .................................. 03100691

(51) Int. Cl.
*G06K 9/32* (2006.01)
*G06K 9/00* (2006.01)
(52) U.S. Cl. .................................................. 382/294
(58) Field of Classification Search .................. 382/294
See application file for complete search history.

(56) References Cited

U.S. PATENT DOCUMENTS

| | | | | |
|---|---|---|---|---|
| 5,034,986 A | * | 7/1991 | Karmann et al. | 382/103 |
| 5,531,520 A | * | 7/1996 | Grimson et al. | 382/131 |
| 5,590,261 A | * | 12/1996 | Sclaroff et al. | 345/473 |
| 5,633,951 A | * | 5/1997 | Moshfeghi | 382/154 |
| 5,815,596 A | * | 9/1998 | Ahuja et al. | 382/173 |
| 5,912,988 A | * | 6/1999 | Moore | 382/209 |
| 5,937,083 A | * | 8/1999 | Ostuni | 382/131 |
| 6,072,542 A | * | 6/2000 | Wilcox et al. | 348/722 |
| 6,301,370 B1 | * | 10/2001 | Steffens et al. | 382/103 |
| 6,363,163 B1 | | 3/2002 | Xu et al. | |
| 6,658,145 B1 | * | 12/2003 | Silver et al. | 382/149 |

(Continued)

OTHER PUBLICATIONS

Xavier Pennec, Pascal Cachier, and Nicholas Ayache, "Understanding the "Demon's Algorithm": 3D Non-rigid Registration by Gradient Descent", 2nd Int. Conf. On Medical Image Computing and Computer-Assisted Intervention, pp. 597-605, Cambridge, UK, Sep. 19-22, 1999.

*Primary Examiner*—Bhavesh M Mehta
*Assistant Examiner*—Michael Vanchy, Jr.

(57) ABSTRACT

A method for matching grayvalued first elements of a first data set with grayvalued second elements of a second data set so that a first distribution of the first elements optimally matches a second distribution of the second elements, said method being characterized by the following steps: mapping said first elements on said second elements and evaluating a local grayvalue distribution difference between any mapped first element and its associated second element; from said local grayvalue distribution difference deriving for each said first element a force vector of a force field, said force vector indicating a preferred motion size and direction; combining said separate force vectors into a single force and a single torque value acting on said first elements collectively, for iteratively moving said first elements collectively to an amended mapping that improves a match between said first and second distributions.

14 Claims, 7 Drawing Sheets

U.S. PATENT DOCUMENTS

| | | | |
|---|---|---|---|
| 6,795,573 B2 * | 9/2004 | Yoshida | 382/149 |
| 2001/0048757 A1 * | 12/2001 | Oosawa | 382/130 |
| 2001/0048758 A1 * | 12/2001 | Oosawa | 382/132 |

* cited by examiner

FIG.5 a) first grayvalue distribution $A(i,j)$
b) second grayvalue distribution $B(i,j)$
c) difference $D(i,j) = A(i,j) - B(i,j)$
d) gradient $G^x(i,j) = \nabla^x D(i,j)$ in X-direction
e) $F^x(i,j) = A(i,j) \cdot G^x(i,j)$
f) gradient $G^y(i,j) = \nabla^y D(i,j)$ in Y-direction
g) $F^y(i,j) = A(i,j) \cdot G^y(i,j)$

METHOD AND APPARATUS FOR OPTIMALLY MATCHING DATA SETS

BACKGROUND OF THE INVENTION

The invention relates to a method for matching grayvalued first elements of a first data set with grayvalued second elements of a second data set so that a first distribution of the first elements optimally matches a second distribution of the second elements, as being furthermore recited in the preamble of claim 1.

Various prior methods have been applied for matching such 2D- or 3D-grayvalue distributions. The elements may be pixels in a spatial 2D or 3D configuration, voxels in 3D, or other. The grayvalue is used for short for a respective single-valued parameter of each such element, such as the grayness of a spatial pixel, but other such variables have been used. A well-known field of application is medical graphical data processing. Such methods examine a plurality of alternative relative locations and orientations, through techniques like correlation or pixel similarity. The actual matching will be decided as based on the highest response for the criterion applied. Next, a transformation matrix will describe the transform from one distribution to the other for the matching position and orientation.

Generally, transformations in medical applications have been limited to rigid or affine transforms, sometimes in a combination wherein selected bone parts of the distribution undergo rigid transformations only, whilst surrounding tissue is transformed by an affine transform.

Another method uses active 2D-contours or active 3D-objects, that may be used to detect edges or sides of anatomical objects in scanned body data. Such contours/objects are in fact virtual objects, that allow finding features in the image data that represent edges of anatomical objects. Such technique will actively find translations, rotations, and deformations of the objects, which will then make them better fit, and which technique may be used to detect edges or sides of anatomical objects in scanned body data. Such techniques will actively find translations, rotations, and deformations of objects, to make them better fit to features in the image data. The best match is one wherein the object has moved around to a stable position that gives the strongest response. Such can either be a local best fit or rather, a global one.

The present inventor has recognized that current procedures are computationally expensive, because the choosing of the best matching transform needs inspecting multiple locations and orientations, and each thereof requires calculating the matching criterion. Moreover, the present inventor has recognized the benefit of iterating procedures.

On the other hand, current methods based on active contours or objects base on interpreting local image features, and in particular, "thin" features. In 2D, such could be a one-dimensional contour or centerline, and in 3D, a curved 2D surface. These methods are therefore typically edge-based, and grayvalue distributions inside a region or object are left out of consideration. On the other hand, a non-uniform grayvalue distribution inside could suggest a false edge, thereby positioning the active contour or object at an erroneous location.

SUMMARY TO THE INVENTION

In consequence, amongst other things, it is an object of the present invention to use both local processing for calculating a match or mismatch, and use the result thereof for controlling an iterative step that implements a relative motion between the first and second distributions. Now therefore, according to one of its aspects, the invention is characterized according to the characterizing part of Claim 1.

In particular, the article by Xavier Pennec, Pascal Cachier, and Nicholas Ayache, "Understanding the "Demon's Algorithm": 3D Non-rigid Registration by Gradient Descent", 2nd Int. Conf. On Medical Image Computing and Computer-Assisted Intervention, pp. 597-605, Cambridge, UK, Sep. 19-22, 1999 discloses an algorithm to represent an approximately second-order descent on the sum of the square of intensity differences criterion. Essentially however, the present invention uses an iterative approach, thereby avoiding various levels of high complexity; in particular, the complexity thereof for relatively simple configurations is negligible.

The invention also relates to a system being arranged for implementing the method as claimed in Claim 1 and to a computer program as claimed in Claim 14. The computer program of the invention can be provided on a data carrier, such as a CD-ROM, or can be downloaded from a data network such as the worldwide web. Further advantageous aspects of the invention are recited in dependent Claims.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures that illustrate.

VARIOUS ELEMENTARY CONSIDERATIONS

The iterative step that imparts a relative motion between the first and second distributions can be interpreted as an energy-optimizing step as is being applied in Active Object approaches. The actual match between the grayvalue distributions is optimized by applying this step iteratively. One grayvalue distribution plays the role of an Active Object, and will automatically execute a number of steps to find its way to a location and orientation that would represent a minimum difference between the two grayvalue distributions, after which the process will stop automatically.

A particular aspect of the present invention is that only local calculations are required, in number substantially equal to the number of image elements involved. State of the art is considered to need a number of calculations that is substantially proportional to at least the square of such number.

Another advantageous aspect of the present invention is that the calculated grayvalue differences will directly lead to a force field that gives directions for relatively repositioning the two grayvalue distributions. No complex evaluation of an energy functional is required.

The proposed Active Object may consist of an arbitrary 2D- or 3D-shape and may contain quite a large number of elements in the form of pixels or voxels. To reduce the number of involved elements that describe a grayvalue distribution, other reduced configurations can be used, like for instance only elements in characteristic sub-areas of the grayvalue distribution. Another possibility of such reducing is downsampling. The latter allows in particular scale-space approaches. Based on an elementary and element-to-element evaluation of the difference between two grayvalue distributions, one force vector is produced for each element of a particular distribution.

The vectors so found can be combined in multiple ways. A straightforward manner is to not allow the elements to move with respect to each other and to combine all force vectors into one single force and one single torque for the whole collection of elements. The first grayvalue distribution win then be made to act as a Rigid Object, that is capable of translation and rotation with respect to the second grayvalue distribution. Relocation (translation and rotation) of the active object is implemented as a number of discrete steps in time, according to the physical model of force that leads to acceleration, acceleration leading to velocity, and velocity leading to displacement. Similarly, torque leads to angular acceleration, which leads to angular velocity, which in turn leads to rotation. The method of the invention can be easily extended with scaling, which is commonly included in what is called rigid deformation.

Another way to combine force vectors is to allow a certain amount of controlled movement between the pixels or voxels of the first grayvalue distribution, for instance to allow an affine deformation of the active object. Higher order deformation of the first grayvalue distribution (the active object) with respect to the second grayvalue distribution is of course also possible.

Various details of the evaluating of the difference between the two grayvalue distributions, the calculation of the forces resulting therefrom, and the translating, rotating, and deformation of the first grayvalue distribution with respect to the second grayvalue distribution will be discussed hereinafter.

DETAILED DESCRIPTION OF PREFERRED EMBODIMENTS

Figure 1A:
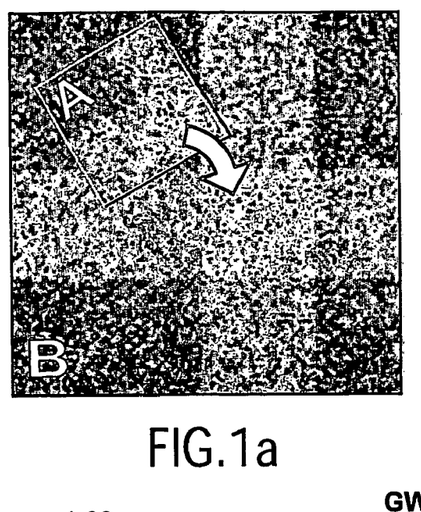
FIGS. 1a, 1b, the matching of grayvalue distribution A, B, by stepwise repositioning.
Figure 1B:
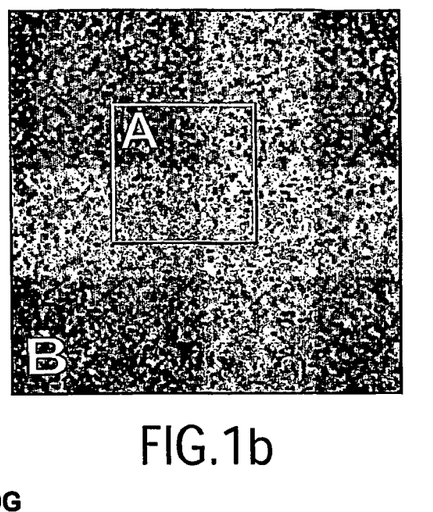

FIGS. 1a, 1b illustrate the matching of grayvalue distribution A, B, by stepwise repositioning. In FIG. 1a, the first distribution indicated by A should be optimally matched to the second distribution indicated by B. By itself, item B is a well-known test pattern, that has both a large-scale grayvalue distribution, and superposed thereon a smaller-scale noise distribution in the grayvalues. The intended match should be both large-scale and small-scale. Now, from the first matching at left, a force will be developed on the first distribution to move it in the direction of the arrow. The intensity of the force and the value of a virtual mass of the first distribution give an acceleration that within a virtual time will produce a translation and/or rotation. The selection of the mass and time units will determine the characteristics of the motion. An underdamped motion will often produce unwanted oscillations. On the other hand, an overdamped motion will take many calculatory cycles. Moreover, it may tend to steer the optimum matching to some local optimum only. For brevity, no dynamic behavior has been considered with respect to this Figure. As shown in FIG. 1b, the optimum attitude has been attained through minimum moving distance. In fact, other positions, each with an associated angle of rotation could with this particular second distribution B produce matchings with respect to the large-scale grayvalue distribution, but not with the superposed noise. These would then result in local optimum positions only. In practice therefore, only a single optimum will prevail. Furthermore, the present invention allows to assign various subsets of the distribution different weights, such as a high weight to parts of the distribution that are considered to have extra relevance over other parts.

Grayvalue Weighted Difference Gradient (GWDG)

The proposed method will be explained in a one-dimensional and in a two-dimensional context. Extension to three dimensions or more is straightforward.

One-Dimensional Explanation

Figure 2:
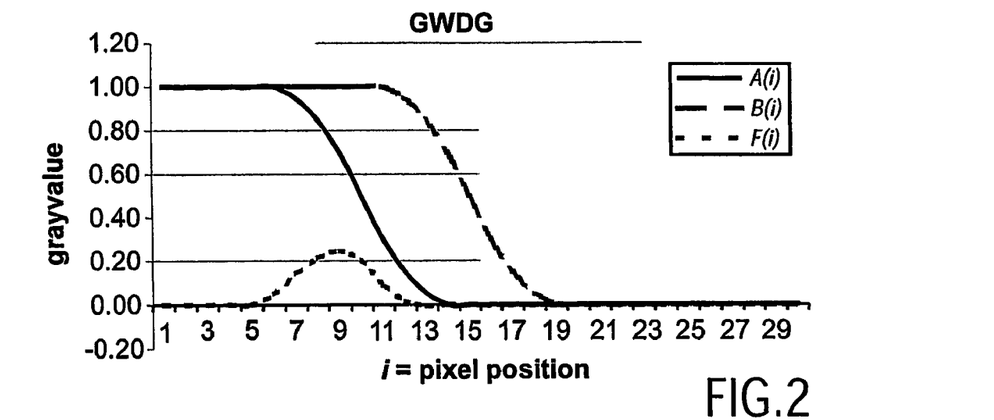
FIG. 2, two one-dimensional grayvalue transitions A(i), B(i) and their Grayvalue Weighted Difference Gradient F(i)

FIG. 2 shows a one-dimensional example, which explains the principle of the GWDG, and how it can be used to match one grayvalue distribution to a second-similar-grayvalue distribution. The curves A(i) and B(i) in this figure represent a one-dimensional grayvalue transition. B(i) is a translated copy of A(i), and the goal is to move A(i) to the position that best matches B(i).

First, the gradient (in the discrete case for instance the central difference) of the difference B(i)−A(i) is calculated:

$$G(i) = \nabla(A(i) - B(i)) \quad (1)$$

Next, the grayvalue gradient G(i) is multiplied with the grayvalue A(i):

$$F(i) = A(i) \cdot G(i) \quad (2)$$

The value of G(i) weighted by A(i) proves to be a very suitable quantity for use as the strength of a force field $\vec{F}(i)$, which will drive A(i) to a position where it fits best to B(i), in the sense that the difference between A(i) and B(i) is minimized.

$$\vec{F}(i) = F(i) \cdot \hat{\imath} \quad (3)$$

It can be noted that the value of F(i) has mostly positive values (in this case) and that A(i) should be shifted to the right, so in positive i-direction. If a positive value of F(i) at a particular pixel position i is interpreted as the strength of a force $\vec{F}(i)$ acting on the pixel A(i) at that location, A(i) will be driven in the positive direction, so in the direction of B(i). See FIG. 3.

Figure 3:
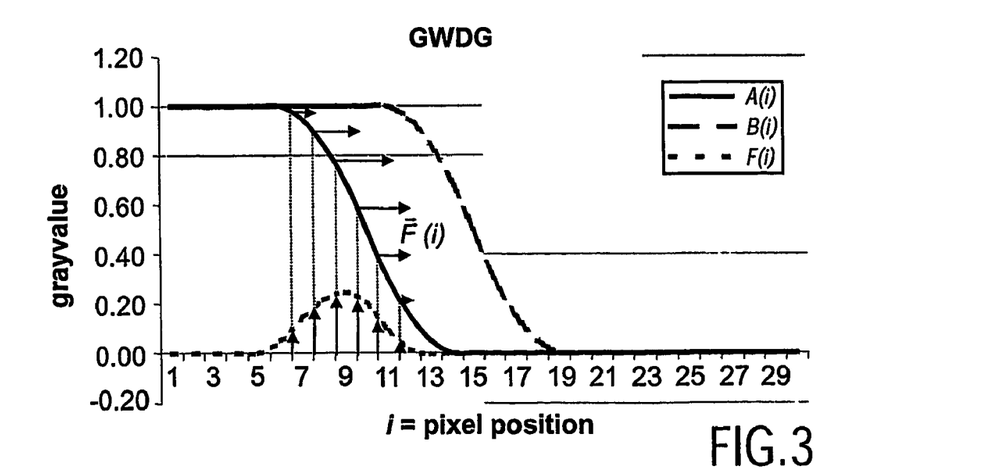
FIG. 3, the value of F(i) used as the strength of a force acting on A(i)

The total force $\vec{F}_t$ following from the force field $\vec{F}(i)$ and acting on the complete curve A(i) is the sum of all separate forces and represents the surface under the curve $\vec{F}(i)$:

$$\vec{F}_t = \sum_i \vec{F}(i) \quad (4) \quad\quad (4)$$

As the differentiation in equation (1) is followed by the summation in (4), $\vec{F}_t$ can be calculated very efficiently.

Figure 4A:
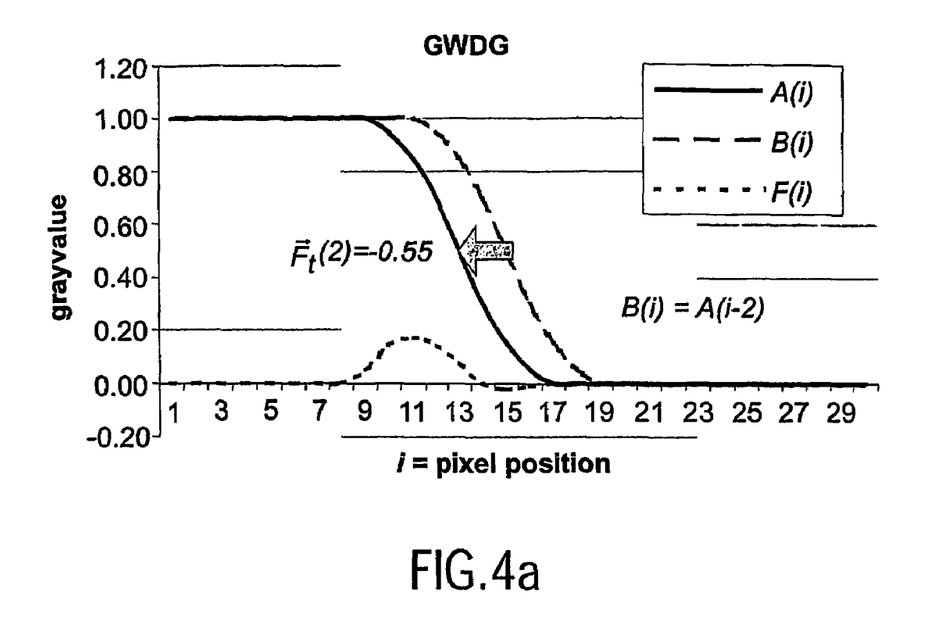
FIGS. 4a, 4b, a symmetrical calculated exemplary force $\vec{F}_t(n)$ for n=2 and n=-2.
Figure 4B:
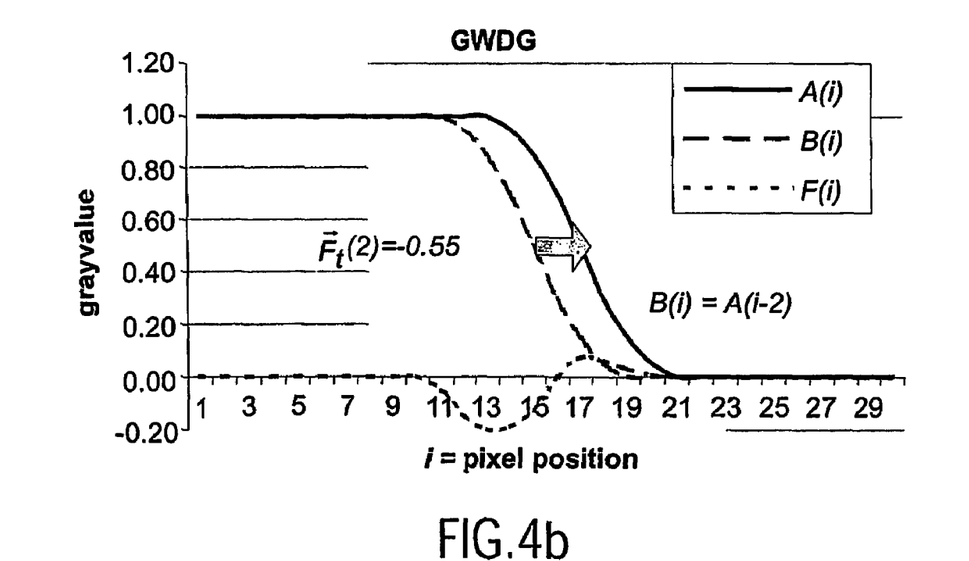

$\vec{F}_t$ appears to be a very suitable quantity to serve as a force field because it is symmetrical with respect to the direction of the translation. In FIG. 3, B(i) is translated in positive direction with respect to A(i), so B(i)=A(i−n), which leads to a particular value $\vec{F}_t(-n)$ for the total force. Translation of B(i) in the opposite direction, so B(i)=A(i+n) leads to a force $\vec{F}_t(n) = -\vec{F}_t(-n)$. See FIG. 4.

Figure 5:
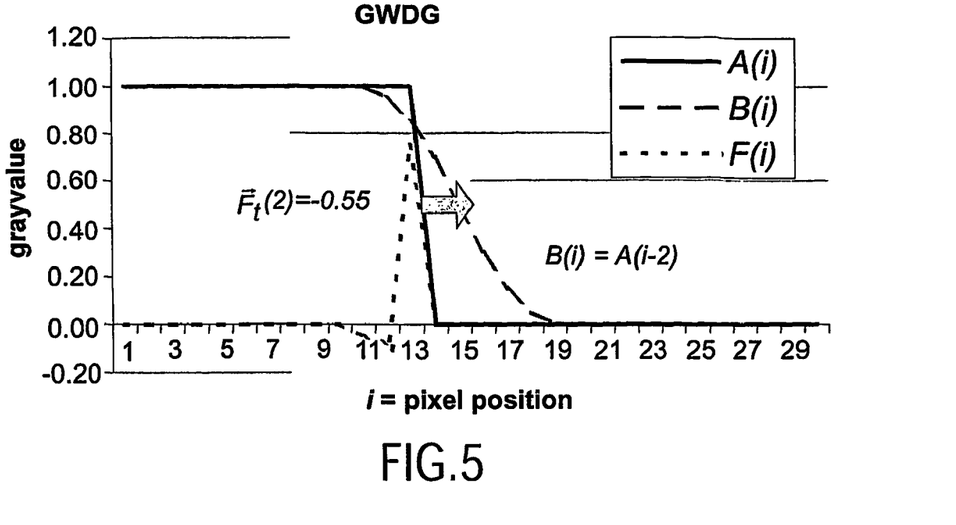
FIG. 5, the invariance of $\vec{F}_t$ for various shapes to be matched.

The shapes, which need to be matched, do not have to be the same. Even a large difference between the two, for instance when matching a stylized model to an actual shape, will still result in a very usable value for $\vec{F}_t$, as illustrated in FIG. 5, where a step function is matched to the smooth transition, with the same relative translation as used in FIG. 4.

Two-Dimensional Explanation

Figure 6:
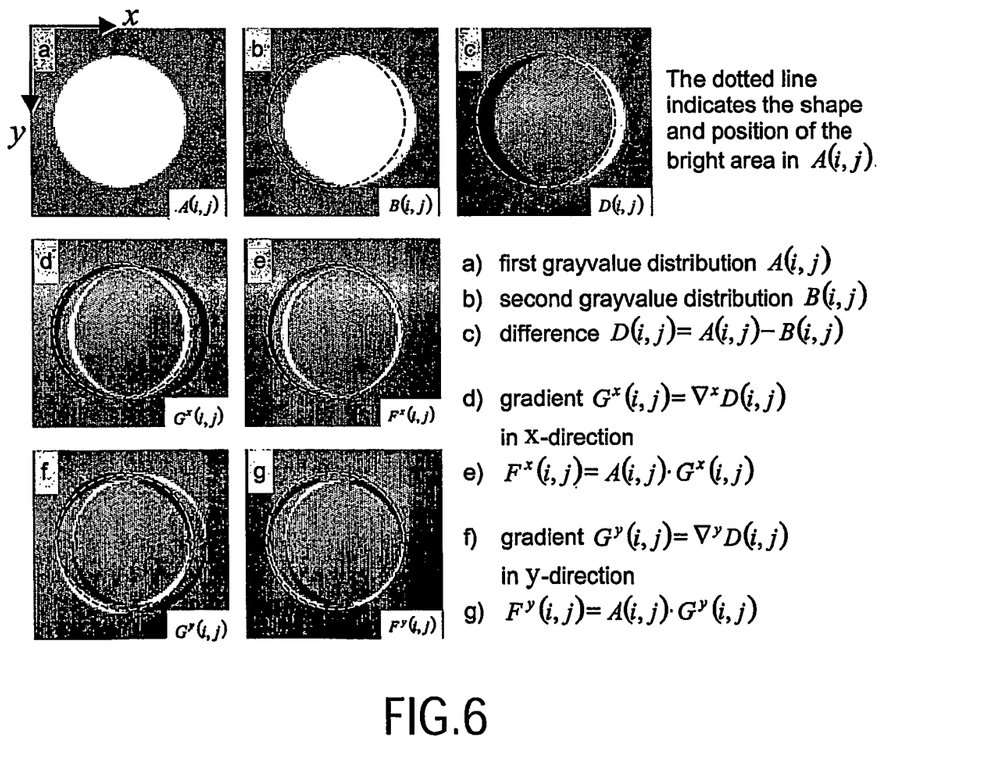
FIGS. 6a through 6g, the two-dimensional calculated force $\vec{F}(i,j)$ split up in components $F^x(i,j)$ and $F^y(i,j)$.

Next, a two-dimensional example will be discussed, see FIG. 6. The top row of FIG. 6 shows in 6a and 6b two simple discrete grayvalue distributions A(i,j) and B(i,j) which are to be matched, such that A(i,j) fits optimally to B(i,j), which is, in this example, again simply a horizontally shifted version of A(i,j).

a) first grayvalue distribution A(i,j)
b) second grayvalue distribution B(i,j)
c) difference D(i,j)=A(i,j)−B(i,j)
d) gradient $G^x(i,j) = \nabla^x D(i,j)$ in X-direction
e) $F^x(i,j) = A(i,j) \cdot G^x(i,j)$
f) gradient $G^y(i,j) = \nabla^y D(i,j)$ in Y-direction
g) $F^y(i,j) = A(i,j) \cdot G^y(i,j)$ First step in the evaluation is to calculate the point-to-point difference D(i,j) between the two grayvalue distributions B(i,j) and A(i,j):

$$D(i,j) = B(i,j) - A(i,j) \quad (5)$$

The values in D(i,j) are non-zero where A(i,j) and B(i,j) are not equal, and as can be seen from FIG. 6c, the grayvalues in D(i,j) clearly show a structured pattern which is related to the direction in which B(i,j) is translated with respect to A(i,j).

For reasons of efficiency and speed, the force field which is to be calculated will be split up in horizontal and vertical components, and the next step is to calculate the grayvalue gradients of D(i,j) in x- and y-directions as shown in FIGS. 6d and 6f. The central difference is for instance used as approximation of the gradient:

$$G^x(i,j) = \nabla^x D(i,j) = D(i+1,j) - D(i-1,j) \quad (6)$$

$$G^y(i,j) = \nabla^y D(i,j) = D(i,j+1) - D(i,j-1) \quad (7)$$

The horizontal and vertical components $F^x(i,j)$ and $F^y(i,j)$ of the force field $\vec{F}(i,j)$ are calculated by weighting the gradient values with A(i,j):

$$F^x(i,j) = A(i,j) \cdot G^x(i,j) \quad (8)$$

$$F_y(i,j) = A(i,j) \cdot G^y(i,j) \quad (9)$$

$$\vec{F}(i,j) = (F^x(i,j), F^y(i,j)) \quad (10)$$

Figure 7:
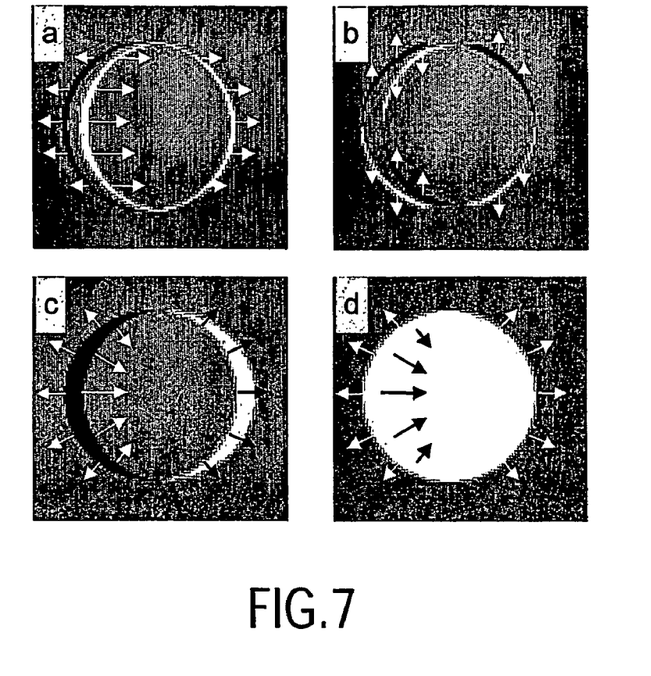
FIGS. 7a through 7d, force field components $F^x(i,j)(a)$ and $F^y(i,j)(b)$, and force field $\vec{F}(i,j)$ overlaid on difference D(i,j) (c) and A(i,j)(d)

FIG. 7 shows—for a limited number of locations—the horizontal and vertical force field components overlaid as arrows on the grayvalue weighted gradient images $F^x(i,j)$ and $F^y(i,j)$, in FIGS. 7a and 7b, and the combined force field on the difference image D(i,j) and the image A(i,j) in FIGS. 7c and 7d, respectively.

From FIGS. 7a and 7b, it can be seen that there will be a resulting total force in the horizontal direction, while the forces in the vertical direction will cancel each other out. In the following sections, it will be explained how grayvalue distribution A(i,j) can be made to act like an Active Object, and how the calculated forces can be applied to move this Active Object to the location that best matches grayvalue distribution B(i,j).

Active Object: a Collection of Active Pixels/Voxels

Grayvalue distribution A(i,j) can be seen as an Active Object consisting of a collection of elements: the pixels or voxels of A(i,j). Each of these elements is subjected to a force $\vec{F}(i,j)$, which is calculated as explained in the preceding sections. There are various possibilities to apply these forces to the collection as a whole depending on the requirements of the application at hand.

Rigid Deformation

Figure 8:
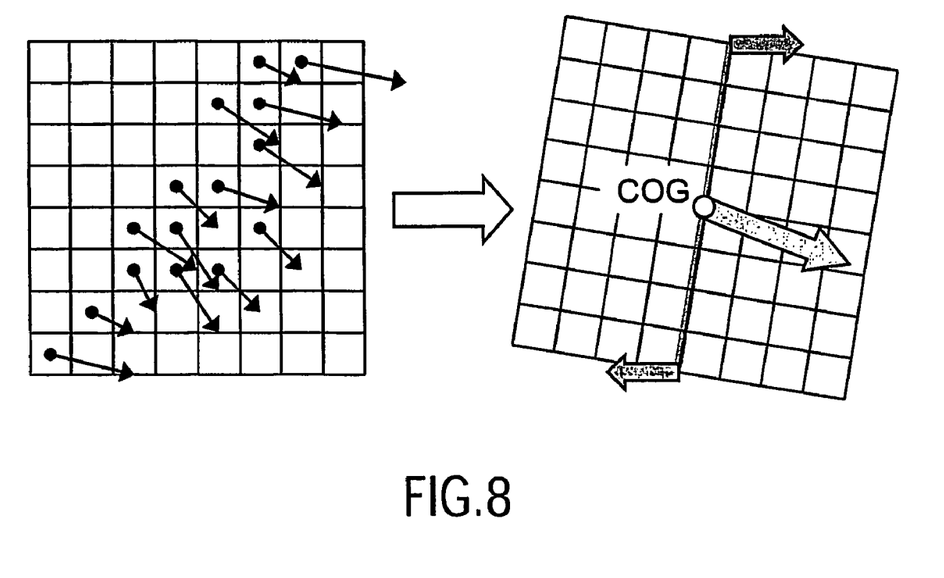
FIGS. 8a, 8b, combining the forces on separate elements to result in one force and one torque on the center of gravity (COG) for the ensemble.

In many cases, rigid deformation of the Active Object will be sufficient, which means that the relative positions of the elements with respect to each other does not change. This leaves the freedom of translation and rotation of the collection as whole. Scaling is commonly also included in rigid deformation. In the one-dimensional case, as shown above (FIG. 3 and equation 4), the separate forces can simply be added together. In the two-dimensional case, things get slightly more complicated, as a combination of separate forces will generally result in one force and one torque acting on the center of gravity (COG) of the whole collection. See FIG. 8.

Non-Rigid Deformation

In the case that non-rigid deformation is required, forces cannot simply be combined into one force and one torque for the Active Object as a whole, as described above. The elements can neither be allowed to move freely with respect to each other, as this would probably lead to complete chaos. Some freedom, however, can be allowed, so that the Active Object can modify its shape in a controlled way.

Figure 9:
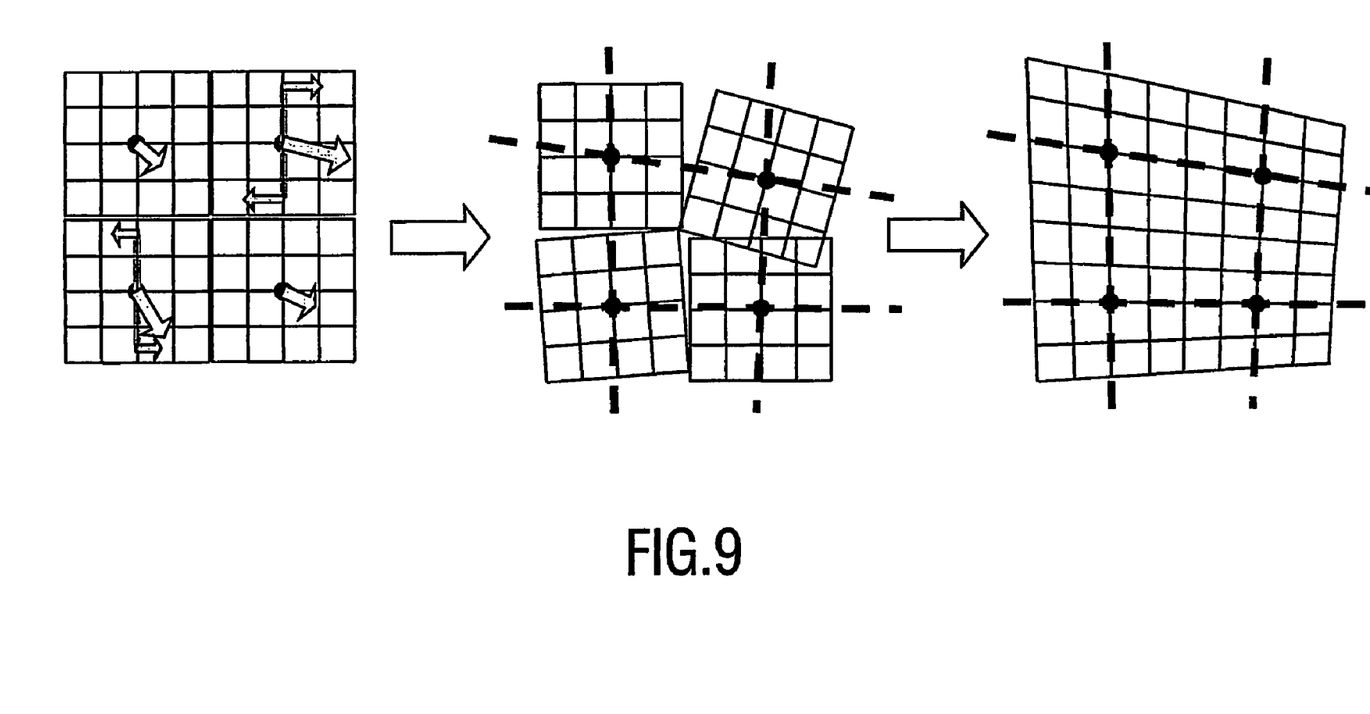
FIGS. 9a through 9c, the non-rigid deformation of a 2D active object with fitting of linear deformation curves.

Now the proposed approach is to subdivide the Active Object in a number of parts, for each of which a force and torque are calculated. After calculating the translation, rotation and scaling for each of these parts, displacement curves can be fitted through the centers of gravity of these parts and the position of each separate element can be adjusted in relation to these curves. This approach is illustrated in FIG. 9, where linear displacement curves are fitted.

If required, higher order curves, and/or further subdivision can be applied to allow for more freedom in reshaping, taking also into account the rotation of the parts.

The smaller the size of the parts into which the Active Object is divided, and the larger their number, the more freedom is allowed for non-rigid deformation.

Combination of Forces

Figure 10:
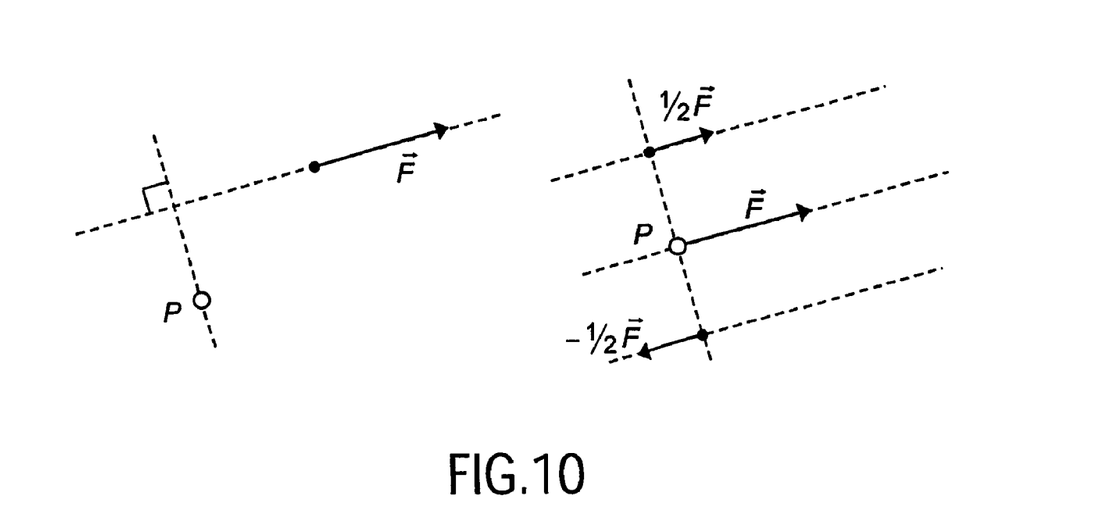
FIGS. 10a, 10b, translating a force $\vec{F}$ into a force and a torque acting on point P.

All forces, which act on the elements, must be translated into one force and one torque acting on the COG of the whole Active Object (or a part of it, in the case of non-rigid deformation). Now, a force acting along a line not passing through a point results in a force on this point combined with a torque, as shown in FIG. 10.

The components $F^x_{tot}$ and $F^y_{tot}$ of the total force $\vec{F}_{tot}$ on the COG of the whole object are determined by summing all x- and y-components of the forces, which act on the separate elements of the Active Object.

$$(11) \quad F^x_{tot} = \sum_{i,j} F^x(i,j) \tag{11}$$

$$(12) \quad F^y_{tot} = \sum_{i,j} F^y(i,j) \tag{12}$$

$$(13) \quad \vec{F}_{tot} = (F^x_{tot}, F^y_{tot}) \tag{13}$$

The total torque $T_{tot}$ on the whole object is determined by summing all separate x- and y-components, taking into account to their distances from $C(x_C, y_C)$, the COG:

$$(14) \quad T_{tot} = \sum_{i,j} F^x(i,j) \cdot (j - y_C) - \sum_{i,j} F^y(i,j) \cdot (i - x_C) \tag{14}$$

Because the Active Objects considered here are grayvalue distributions consisting of a collection of pixels or voxels that are neatly arranged in a grid, the combination of the separate forces into one force and torque for the whole object, can be implemented very efficiently according to equations (13) and (14).

Implementation of Translation, Rotation, Scaling

Translation

The process of repositioning the first grayvalue distribution (the Active Object) with respect to the second are is implemented as an iterative discrete time stepping process, which means that the dynamic process is evaluated at equally spaced discrete points in time $t=k\Delta t$, and that the situation is assumed not to change in between successive evaluation points. This approach was described earlier and successfully applied to 2D Active Contours. It mimics the basic physics of force leading to acceleration, acceleration leading to velocity, and velocity leading to displacement.

The force that acts in this case on the Active Object at time t is the total force $\vec{F}_{tot}(t)$, as derived in the previous chapter. The iterative discrete time stepping process is implemented as the following loop:

$$\text{calculate } \vec{F}_{tot}(t) \tag{15}$$
$$\vec{a}(t) = \frac{1}{m}\vec{F}_{tot}(t)$$
$$\vec{v}(t) = \vec{v}(t - \Delta t) + \vec{a}(t) \cdot \Delta t$$
$$\vec{p}(i, j, t) = \vec{p}(i, j, t - \Delta t) + \vec{v}(t) \cdot \Delta t$$
$$t = t + \Delta t$$

In these equations, the vector $\vec{a}(t)$ denotes the acceleration of the Active Object at time t, the variable m stands for the mass of the object which can for instance be set to 1 for simplicity or derived from the grayvalue distribution, $\vec{v}(t)$ is the velocity, and $\vec{p}(i,j,t)$ the position of element (i,j) at time t. Efficiency can be further improved by setting $\Delta t = 1$.

To ensure stability, a damping force must be added, changing the calculation of $\vec{F}_{tot}(t)$ and $\vec{a}(t)$ in equation (15) to:

$$(16) \quad \text{calculate } \vec{F}_{tot}(t) \tag{16}$$
$$\text{damping } \vec{F}_{damp}(t) = -\alpha\vec{v}(t - \Delta t), 0 < \alpha < 1$$
$$\vec{a}(t) = \frac{1}{m}(\vec{F}_{tot}(t) + \vec{F}_{damp}(t))$$

This iterative process is stopped automatically when both $\vec{a}(t)$ and $\vec{v}(t)$ are smaller than a user definable (very) small value. As this process represents a translation, the same displacement $\vec{v}(t)$ is applied to all elements of the Active Object.

Rotation

Rotation is implemented very similarly to translation. In this case, however the variables are $T_{tot}(t)$ which represents the torque on the Active Object at time t, the angular acceleration b(t), the angular velocity w(t), and the vector $\vec{q}(i,j,t)$, which stands for the position of element (i,j) relative to the COG at time t.

$$(17) \quad \text{calculate } T_{tot}(t) \tag{17}$$
$$\text{damping } T_{damp}(t) = -\beta w(t - \Delta t), 0 < \beta < 1$$
$$b(t) = \frac{1}{m}(T_{tot}(t) + T_{damp}(t))$$
$$w(t) = w(t - \Delta t) + b(t)$$
$$\vec{q}(i, j, t) = \text{Rotation}(\vec{q}(i, j, t - \Delta t), w(t))$$
$$t = t + \Delta t$$

The rotation of $\vec{q}(i,j,t)$ is over an angle $\vec{w}(t)$ around the COG. A similar stopping criterion can be used as for translation.

Scaling

To include enlargement or shrinking of the Active Object, we need to know whether the forces $\vec{F}(i,j)$ which act on the individual elements give a positive or negative result after projecting these forces on the position vector $\vec{q}(i,j)$ which points from the COG to the element, and summing these projections over all elements. A more practical implementation is to accumulate all x- and y-components $F^x(i,j)$ and $F^y(i,j)$ of $\vec{F}(i,j)$ in the following way.

$$(18) \quad S_{tot} = \sum_{i,j} F^x(i,j) \cdot \text{sign}(i - x_C) + \sum_{i,j} F^y(i,j) \cdot \text{sign}(j - y_C) \tag{18}$$

Experiments have shown that a simple growing or shrinking process gives satisfactory results. The scaling is therefore not implemented as a dynamic force-driven process like the translation and rotation. Instead, a simple enlargement factor is introduced which is applied to the vectors $\vec{q}(i,j)$:

$$(19) \quad \vec{q}(i, j, t) = \left(1 + \frac{S_{tot}}{s}\right) \cdot \vec{q}(i, j, t - \Delta t) \quad (19)$$

where s is a user definable constant to control the effect of scaling.

Translation, rotation and scaling can all be combined in one iterative process, performing all three actions in the same iteration. Another approach is to apply these three operations in an alternating pattern, for instance after every fifth translation step, do one rotation step and one scaling step.

If desired, weight factors can be added to balance of influence the effects of the three operations with respect to each other.

APPLICATIONS

An obvious application in medical imaging is landmark matching, where it is required to fit the grayvalue distribution around characteristic locations (landmarks) in one dataset, to the grayvalue distribution in a second dataset, with the purpose of locating the corresponding characteristic locations in this second dataset, which can be used for registration of the two datasets. Landmarks can be selected (semi-)automatically, or indicated by a user. Related to the above is the automated location of landmarks by fitting landmark models to a dataset.

Some examples of other application areas are satellite images, astronomy, temporal processing of video frames, identification, and pattern recognition for security and surveillance.

The described method can also be used to provide computer assistance to users who need to interactively position graphics objects or the like to image data. Stylized grayvalue distributions can be assigned to such graphics objects, which can then be matched to the grayvalues in the image.

Matching of grayvalue distributions (1D, 2D or 3D) as described here, can also be an alternative for current grayvalue profile matching applications or Appearance Modeling approaches.

Figure 11:
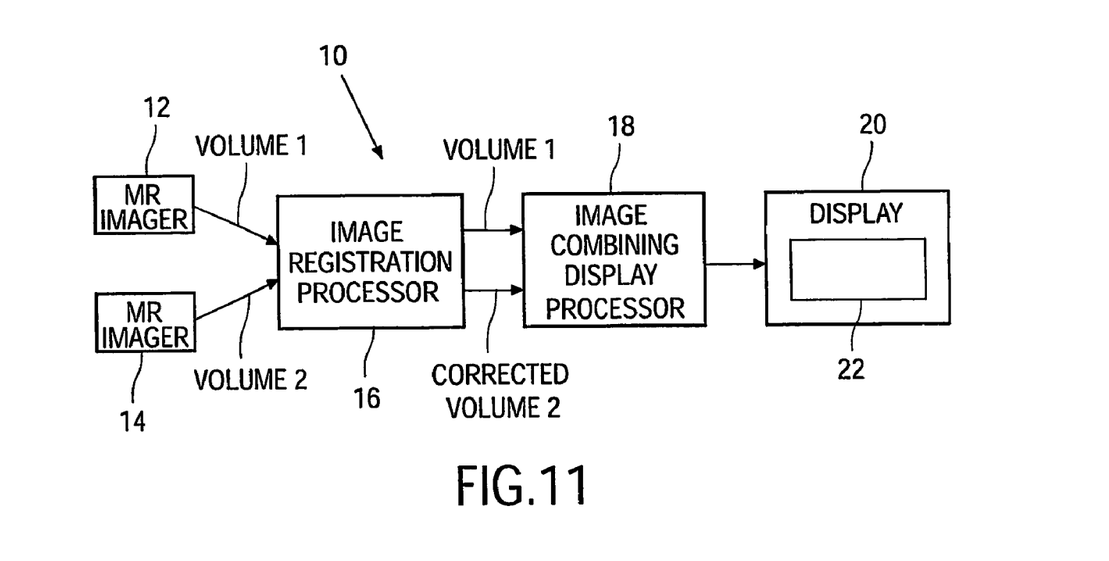
FIG. 11, a procedural block diagram of a preferred embodiment.

FIG. 11 illustrates a procedural block diagram of a preferred embodiment, the Figure by itself having been taken from earlier U.S. Pat. No. 5,633,951 to the same assignee. Here, two images generated by respective imaging systems 12 (magnetic resonance) and 14 (computer tomography) will have to be combined in an optimum match. However, the procedure can be effected likewise with MR versus MR images, or with any usable source for such images. Now first, in processor 16, the two volume distributions are registered for generating the optimum match, through correcting volume 2, such as by translating, rotating, or by still more complicated procedures as have been considered supra. Next, in processor 18, the two distributions so registered are actually combined for imaging on display 20 at right.

Figure 12:
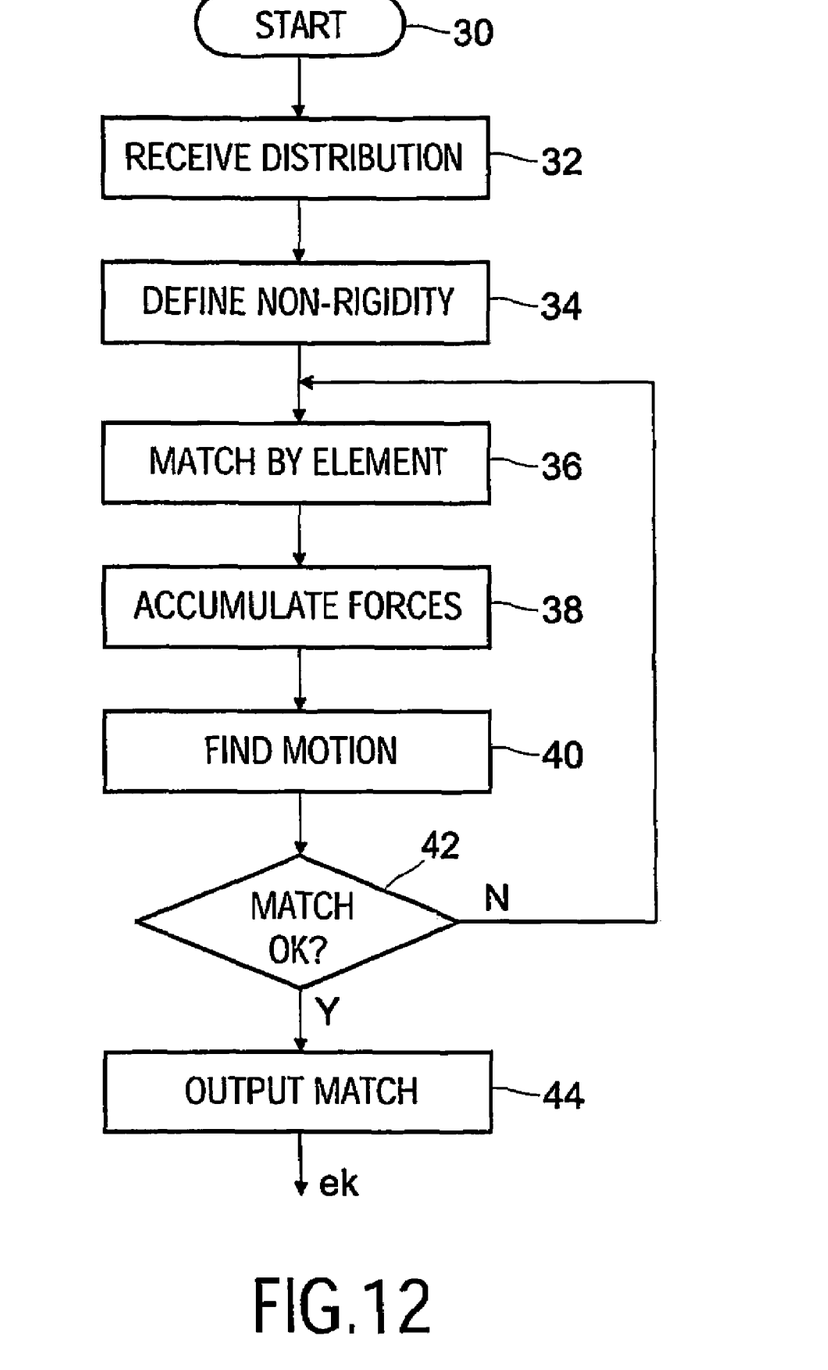
FIG. 12, a flow diagram of an iterative procedure according to the invention.

FIG. 12 illustrates a flow diagram of an interactive procedure according to the invention. In block 30, the system is started, and the relevant hardware and software facilities are assigned. Next, in block 32, the two distributions are received, such as from background storage. Next, in block 34, the non-rigidity and other procedures for amending the procedure from straightaway uniform matching, are appropriately assigned to one of the distributions, if necessary. In block 36, the two distributions are matched element-by-element, and the element-wise forces are derived. Next, in block 38 the forces are accumulated or combined, such as to one force and one torque, or rather, to a more complicated set of forces/torques. In block 40, the motion caused by the force(s)/torque (s) is calculated: determined displacement or reposition. In block 42, the overall match is found, and checked for sufficiency. If no, the system reverts to block 36. If yes, the match is outputted in block 44. Alternatively, block 42 could also sit at the output of block 36.

Now, the present invention has hereabove been disclosed with reference to preferred embodiments thereof. Persons skilled in the art will recognize that numerous modifications and changes may be made thereto without exceeding the scope of the appended Claims. In consequence, the embodiments should be considered as being illustrative, and no restriction should be construed from those embodiments, other than as have been recited in the Claims.

The invention claimed is:

1. A method for matching grayvalued first elements of a first data set with grayvalued second elements of a second data set so that a first distribution of the first elements optimally matches a second distribution of the second elements, said method comprising the steps of:
   mapping said first elements on said second elements and evaluating a local grayvalue distribution difference between any mapped first element and its associated second element;
   from said local grayvalue distribution difference deriving for each said first element a force vector of a force field, said force vector indicating a preferred motion size and direction; and
   combining said separate force vectors into a single force and a single torque value acting on said first elements collectively, for iteratively moving said first elements collectively to an amended mapping that improves a match between said first and second distributions.

2. A method as claimed in claim 1, whilst executing said iteratively moving until a sufficient match is attained.

3. A method as claimed in claim 1, wherein for each said deriving the number of calculations is substantially linear in the number of said first elements.

4. A method as claimed in claim 1, wherein said first and second elements form respective subsets of respective supersets of elements.

5. A method as claimed in claim 4, wherein said subsets are selected on the basis of representing characteristic features of said supersets.

6. A method as claimed in claim 4, wherein said subsets are selected through down-sampling.

7. A method as claimed in claim 1, wherein said combining combines all said vectors into a single force and into a single torque value by preventing said first elements to move with respect to each other.

8. A method as claimed in claim 1, whilst allowing a predetermined amount of motion between the elements of the first distribution.

9. A method as claimed in claim 8, wherein said allowing subjects to an affine transform or a higher order deformation.

10. A method as claimed in claim 1, for medical imaging landmark matching.

11. A method as claimed in claim 1, and applied for one of satellite images, astronomy images, temporal processing of video frames, identification of human or artifact images, and pattern recognition for security, surveillance or reconnaissance.

12. A method as claimed in claim 1, wherein said motion is subjected to a damping restraint.

13. A system being arranged for matching grayvalued first elements of a first data set with grayvalued second elements of a second data set so that a first distribution of the first elements optimally matches a second distribution of the second elements, said system comprising:

a reception facility for receiving said first and second data sets;

a mapping facility fed by said reception facility for mapping said first elements on said second elements and evaluating a local grayvalue distribution difference between any mapped first element and its associated second element;

a force deriving facility fed by said mapping facility for said local grayvalue distribution difference deriving for each said first element a force vector of a force field, said force vector indicating a preferred motion size and direction;

a combining facility fed by said force deriving facility for combining said separate force vectors into a single force and a single torque value acting on said first elements collectively, for iteratively moving said first elements collectively to an amended mapping that improves a match between said first and second distributions, and a loop facility for retrocoupling said amended mapping to said mapping facility and/or to said force deriving facility.

14. A computer readable medium including code for matching grayvalued first elements of a first data set with grayvalued second elements of a second data set so that a first distribution of the first elements optimally matches a second distribution of the second elements, said medium comprising:

code for mapping said first elements on said second elements and evaluating a local grayvalue distribution difference between any mapped first element and its associated second element;

code for deriving, from said local grayvalue distribution difference, each said first element a force vector of a force field, said force vector indicating a preferred motion size and direction;

code for combining said separate force vectors into a single force and a single torque value acting on said first elements collectively, for iteratively moving said first elements collectively to an amended mapping that improves a match between said first and second distributions.

* * * * *